(12) United States Patent
Du et al.

(10) Patent No.: US 8,717,942 B2
(45) Date of Patent: May 6, 2014

(54) METHOD AND NETWORK DEVICE FOR PACKET CONTENT TRANSLATION

(75) Inventors: Cheng-Wei Du, Suzhou (CN);
Hong-June Hsue, Hsinchu (TW);
Chun-Kuei Chang, Miaoli County (TW); Chen-Yi Cheng, Tainan (TW)

(73) Assignee: Realtek Semiconductor Corp., Hsinchu (TW)

( * ) Notice: Subject to any disclaimer, the term of this patent is extended or adjusted under 35 U.S.C. 154(b) by 170 days.

(21) Appl. No.: 13/366,362

(22) Filed: Feb. 6, 2012

(65) Prior Publication Data

US 2012/0213103 A1    Aug. 23, 2012

(30) Foreign Application Priority Data

Feb. 22, 2011   (CN) .......................... 2011 1 0043995

(51) Int. Cl.
*H04L 12/28* (2006.01)
*H04J 3/16* (2006.01)
(52) U.S. Cl.
USPC .......................................... 370/255; 370/465
(58) Field of Classification Search
USPC ........................ 370/252, 254, 255, 465–467
See application file for complete search history.

(56) References Cited

U.S. PATENT DOCUMENTS

| | | | | |
|---|---|---|---|---|
| 6,305,013 B1 * | 10/2001 | Miyamoto | .................... | 717/146 |
| 7,792,100 B2 * | 9/2010 | Hato et al. | .................... | 370/389 |
| 7,912,071 B2 * | 3/2011 | Ikeda et al. | ............. | 370/395.53 |
| 8,483,218 B2 * | 7/2013 | Lee et al. | ...................... | 370/392 |
| 8,509,115 B2 * | 8/2013 | Zeng et al. | .................... | 370/254 |
| 2001/0042143 A1 * | 11/2001 | Ooba et al. | ...................... | 710/22 |

* cited by examiner

*Primary Examiner* — Hong Cho
(74) *Attorney, Agent, or Firm* — McClure, Qualey & Rodack, LLP

(57) ABSTRACT

The disclosure provides a method and a network device for packet content translation, wherein the network device comprises: a packet analyzing unit, a packet comparing unit, and a calculating unit, and the method comprises: providing a packet content translation criteria table; obtaining characteristic information of a packet; comparing the characteristic information of the packet with the packet content translation criteria table to determine whether a corresponding match entry is found in the packet content translation criteria table; and using the calculating unit to perform a packet content translation for the packet according to a packet processing mode indicated by the corresponding match entry. The method and the network device for packet content translation of the disclosure can reduce resource requirement for network equipments.

10 Claims, 4 Drawing Sheets

| Packet criteria | New VID |
|---|---|
| C-VID 10 | S-VID 110 |
| C-VID 11 | S-VID 111 |
| S-VID 111 | C-VID 11 |
| . . . | . . . |

FIG. 1

| Field Type | Packet criteria | | Operand | Operation | New S-VID |
|---|---|---|---|---|---|
| | Data (32-bit) | Mask (32-bit) | | | |
| C-VID | 1000 | 0xFFF0 | 100 | "+" | Based on C-VID |
| S-VID | 2000 | 0xFF00 | 500 | "-" | Based on S-VID |
| Destination port | 0 | All 1s | - | - | Remove S-TAG |
| Source port | 0 | All 1s | 100 | "+" | Based on C priority |
| Source port | 1 | All 1s | 200 | "+" | Based on S priority |
| ... | | | ... | ... | ... |

FIG. 3

METHOD AND NETWORK DEVICE FOR PACKET CONTENT TRANSLATION

BACKGROUND OF THE INVENTION

1. Field of the Invention

The disclosure relates to a method and a network device for packet content translation.

2. Description of the Prior Art

In general, in a Virtual Local Area Network (VLAN), when the conventional packet content translation method selects a new Virtual Identification (VID) such as a Service Tag Virtual Identification (S-VID) or a Customer Tag Virtual Identification (C-VID), the new VID is usually a fixed value which is configured in advance.

Please refer to FIG. 1. FIG. 1 shows a packet content translation criteria table utilized by the conventional packet content translation method. As shown in FIG. 1, if a packet's C-VID is 10, it will match a first entry in the packet content translation criteria table, and the conventional packet content translation method will translate the C-VID "10" of the packet to be a S-VID 110". If another packet's C-VID is 11, it will match a second entry in the packet content translation criteria table, and the conventional packet content translation method will translate the C-VID "11" of the packet to be a S-VID 111". Since every VID has to occupy an entry, the more VID are required in the VLAN, the more resources are required. In other words, the conventional packet content translation method has a very high requirement for resources in network equipments.

SUMMARY OF THE INVENTION

It is therefore one of the objectives of the disclosure to provide a method and a network device for packet content translation, and the method and the network device for packet content translation of the disclosure can reduce the requirement for resources in network equipments, so as to solve the above problem.

In accordance with an embodiment of the disclosure, a method for packet content translation is disclosed. The method comprises: providing a packet content translation criteria table; obtaining characteristic information of a packet; comparing the characteristic information of the packet with the packet content translation criteria table to determine whether a corresponding match entry is found in the packet content translation criteria table; and using a calculating unit to perform a packet content translation for the packet according to a packet processing mode indicated by the corresponding match entry.

In accordance with an embodiment of the disclosure, a network device for packet content translation is disclosed. The network device comprises: a packet analyzing unit, a packet comparing unit, and a calculating unit. The packet analyzing unit is utilized for obtaining characteristic information of a packet. The packet comparing unit is utilized for comparing the characteristic information of the packet with the packet content translation criteria table to determine whether a corresponding match entry is found in the packet content translation criteria table. The calculating unit is utilized for performing a packet content translation for the packet according to a packet processing mode indicated by the corresponding match entry.

Briefly summarized, the method and the network device for packet content translation disclosed by the disclosure can reduce resource requirement in network equipments. In addition, the method and the network device for packet content translation disclosed by the disclosure can be applied to various hardware for receiving and transmitting packets in network systems, and thus there is no specific limitation in the applications of the method and the network device for packet content translation disclosed by the disclosure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 shows a packet content translation criteria table utilized by the conventional packet content translation method.

FIG. 3 shows a packet content translation criteria table of an exemplary embodiment.

DETAILED DESCRIPTION

Figure 2:
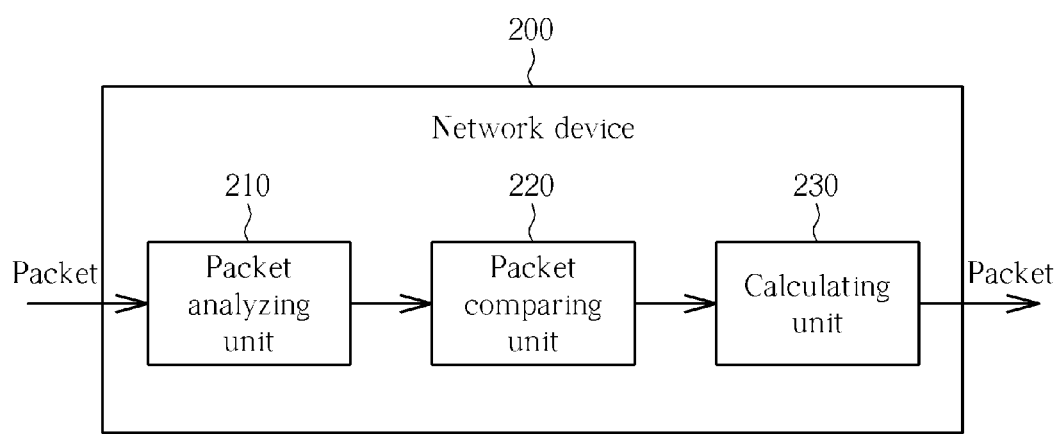
FIG. 2 shows a simplified block diagram of a network device for packet content translation of an exemplary embodiment.

Please refer to FIG. 2. FIG. 2 shows a simplified block diagram of a network device 200 for packet content translation of an exemplary embodiment. As shown in FIG. 2, the network device 200 comprises: a packet analyzing unit 210, a packet comparing unit 220, and a calculating unit 230. The packet analyzing unit 210 is utilized for obtaining characteristic information of a packet, wherein when the packet is a packet in a Virtual Local Area Network (VLAN), the characteristic information of the packet includes at least one of a source port of the packet, a Destination Media Access Control Address (DMAC Address), a Source Media Access Control Address (SMAC Address), a Service Tag Provider Identification (S-Tag PID), a Customer Tag Provider Identification (C-Tag PID), a Service Tag Virtual Identification (S-VID), a Customer Tag Virtual Identification (C-VID), a priority of the S-Tag, and a priority or a Differentiated Services Code Point (DSCP) in the C-Tag.

The packet comparing unit 220 is utilized for comparing the characteristic information of the packet with the packet content translation criteria table to determine whether a corresponding match entry is found in the packet content translation criteria table. The calculating unit 230 is utilized for performing a packet content translation for the packet according to a packet processing mode indicated by the corresponding match entry. In addition, if the packet comparing unit 220 does not find the corresponding match entry, the function of the calculating unit 230 comprises: transferring or discarding the packet.

The function of the calculating unit 230 for performing the packet content translation for the packet according to the packet processing mode indicated by the corresponding match entry can comprise: obtaining at least an operation and at least an operand from the corresponding match entry; and processing the characteristic information of the packet according to the operation and the operand. In addition, the function of the calculating unit 230 for performing the packet content translation for the packet according to the packet processing mode indicated by the corresponding match entry also comprise: obtaining at least an operand from the corresponding match entry; and processing the characteristic information of the packet according to a predetermined operation function and the operand, wherein the packet content translation of each packet uses the predetermined operation function. Moreover, the packet processing mode indicated by the corresponding match entry comprises reference information indicating a specific characteristic value in the characteristic information of the packet to perform translation. When the packet is a packet in a VLAN, the specific characteristic value comprises at least one of a DMAC Address, an SMAC Address, an S-Tag PID, a C-Tag PID, an S-VID, a C-VID, a priority of the S-Tag, and a priority or a DSCP in the C-Tag.

Please refer to FIG. 3. FIG. 3 shows a packet content translation criteria table of an exemplary embodiment. For example, the disclosure uses an ordinary matching scheme "Ternary Content-Addressable Memory T-CAM" in this embodiment. The T-CAM comprises data column and mask column. The disclosure obtains characteristic information of a packet with reference to a field type, and makes it to be 32 bits as an input of the T-CAM. The mask column represents those bits of the input and the data column required to be precisely matched when comparing the characteristic information of the packet with the packet content translation criteria table. If the bit n of the mask column is 1, it means that the bit n of the input and the bit n of the data column have to be the same, and this is regarded as matched. If the bit m of the mask column is 0, it means whatever the input is, this is regarded as matched. If certain entry's 32 bits are regarded as matched, it means that a corresponding match entry is found in the packet, and the disclosure will perform a packet content translation for the packet according to a packet processing mode indicated by the corresponding match entry.

As shown in FIG. 3, when the method for packet content translation of the disclosure obtains a characteristic information of a packet, and the value of the C-VID is in the range of [992, 1007], the method of the disclosure will compare the characteristic information of the packet with the packet content translation criteria table and find a corresponding match entry (i.e. the first translation entry in FIG. 3). Next, the method of the disclosure will use the calculating unit 230 to perform a packet content translation for the packet according to a packet processing mode indicated by the corresponding match entry, wherein the step of using the calculating unit 230 to perform the packet content translation for the packet according to the packet processing mode indicated by the corresponding match entry includes: obtaining an operation and an operand from the corresponding match entry (i.e. "100" and "+" in FIG. 3); and processing the characteristic information of the packet according to the operation and the operand. In addition, the packet processing mode indicated by the corresponding match entry is performing according to the setting in the column of new S-VID, that is, performing the translation for the C-VID of the packet. In other words, the packet will have a new S-VID after performing the packet content translation, and the new S-VID is [1092, 1107]. In this way, compared to the condition of requiring 16 match entries in prior art, the method and the network device for packet content translation of the disclosure only requires one match entry, and thus the disclosure can reduce resource requirement for network equipments.

Please note that the above embodiment is only for an illustrative purpose and is not meant to be a limitation of the disclosure. In any case, various modifications and alterations of the device and method should fall into the disclosed scope of the disclosure. For example, the packet does not need a new S-VID after performing the packet content translation, the packet also can have a new C-VID, a new priority of the S-Tag, a new priority in the C-Tag, or a new DSCP in the C-Tag, etc. The step of using the calculating unit 230 to perform the packet content translation for the packet according to the packet processing mode indicated by the corresponding match entry also can comprise: obtaining at least an operand from the corresponding match entry; and processing the characteristic information of the packet according to a predetermined operation function (such as "+", "−", "×", "÷", or a combination of "+", "−", "×", "÷") and the operand, wherein the packet content translation of each packet uses the predetermined operation function. In addition, the predetermined operation function also can be a fixed operation function, and the operand also can be a fixed operand.

Figure 4:
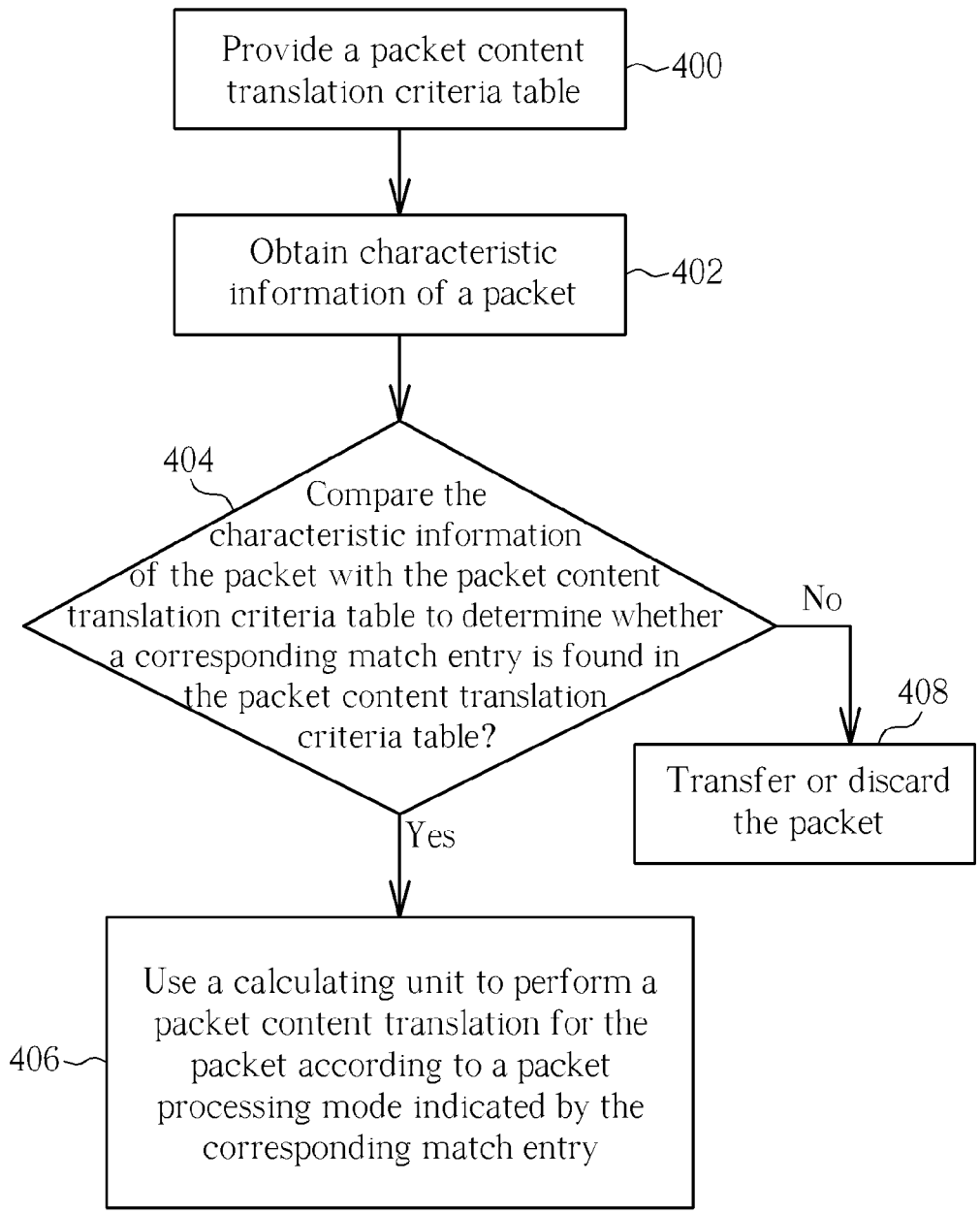
FIG. 4 shows a flowchart showing a method for packet content translation of an exemplary embodiment.

Please refer to FIG. 4. FIG. 4 shows a flowchart showing a method for packet content translation of an exemplary embodiment. Provided that substantially the same result is achieved, the steps of the process flowchart do not have to be in the exact order shown in FIG. 4 and need not be contiguous, meaning that other steps can be intermediate. The method of the disclosure comprises the following steps:

Step 400: Provide a packet content translation criteria table.

Step 402: Obtain characteristic information of a packet.

Step 404: Compare the characteristic information of the packet with the packet content translation criteria table to determine whether a corresponding match entry is found in the packet content translation criteria table; if the corresponding match entry is found, perform Step 406; if the corresponding match entry is not found, perform Step 408.

Step 406: Use a calculating unit to perform a packet content translation for the packet according to a packet processing mode indicated by the corresponding match entry.

Step 408: Transfer or discard the packet.

The Step 402 can be performed during the process of receiving and transmitting the packet, and the Step 406 can further comprise: obtaining at least an operation and at least an operand from the corresponding match entry; and processing the characteristic information of the packet according to the operation and the operand. Or, the Step 406 can further comprise: obtaining at least an operand from the corresponding match entry; and processing the characteristic information of the packet according to a predetermined operation function and the operand, wherein the packet content translation of each packet uses the predetermined operation function. In addition, the packet processing mode indicated by the corresponding match entry comprises: reference information indicating a specific characteristic value in the characteristic information of the packet to perform translation. Please note that the above embodiment is only for an illustrative purpose and is not meant to be a limitation of the disclosure. In any case, various modifications and alterations of the method should fall into the disclosed scope of the disclosure.

Briefly summarized, the method and the network device for packet content translation disclosed by the disclosure can reduce resource requirement for network equipments. In addition, the method and the network device for packet content translation disclosed can be applied to various hardware for receiving and transmitting packets in network systems, and thus there is no specific limitation in the applications of the method and the network device for packet content translation disclosed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for packet content translation, comprising:

providing a packet content translation criteria table;

obtaining characteristic information of a packet;

comparing the characteristic information of the packet with the packet content translation criteria table to determine whether a corresponding match entry is found in the packet content translation criteria table; and using a calculating unit to perform a packet content translation for the packet according to a packet processing mode indicated by the corresponding match entry, wherein using comprises:

obtaining at least an operation and at least an operand from the corresponding match entry; and processing the characteristic information of the packet according to the operation and the operand.

2. The method of claim 1, further comprising:

transferring or discarding the packet if the corresponding match entry is not found.

3. The method of claim 1, wherein the packet is a packet in a Virtual Local Area Network (VLAN), and the characteristic information of the packet comprises at least one of a source port of the packet, a Destination Media Access Control Address (DMAC Address), a Source Media Access Control Address (SMAC Address), a Service Tag Provider Identification (S-Tag PID), a Customer Tag Provider Identification (C-Tag PID), a Service Tag Virtual Identification (S-VID), a Customer Tag Virtual Identification (C-VID), a priority of the S-Tag, and a priority or a Differentiated Services Code Point (DSCP) in the C-Tag.

4. The method of claim 1, wherein the packet processing mode indicated by the corresponding match entry comprises: reference information indicating a specific characteristic value in the characteristic information of the packet to perform translation.

5. The method of claim 4, wherein the packet is a packet in a VLAN, and the specific characteristic value is at least one of a DMAC Address, an SMAC Address, an S-Tag PID, a C-Tag PID, an S-VID, a C-VID, a priority of the S-Tag, and a priority or a DSCP in the C-Tag.

6. A network device for packet content translation, comprising:

a packet analyzing unit, for obtaining characteristic information of a packet;

a packet comparing unit, for comparing the characteristic information of the packet with the packet content translation criteria table to determine whether a corresponding match entry is found in the packet content translation criteria table; and a calculating unit, for performing a packet content translation for the packet according to a packet processing mode indicated by the corresponding match entry, wherein the calculating unit performs by:

obtaining at least an operand from the corresponding match entry; and processing the characteristic information of the packet according to a predetermined operation function and the operand, wherein the packet content translation of each packet uses the predetermined operation function.

7. The network device of claim 6, wherein the function of the calculating unit further comprises:

transferring or discarding the packet if the corresponding match entry is not found.

8. The network device of claim 6, wherein the packet is a packet in a Virtual Local Area Network (VLAN), and the characteristic information of the packet comprises at least one of a source port of the packet, a Destination Media Access Control Address (DMAC Address), a Source Media Access Control Address (SMAC Address), a Service Tag Provider Identification (S-Tag PID), a Customer Tag Provider Identification (C-Tag PID), a Service Tag Virtual Identification (S-VID), a Customer Tag Virtual Identification (C-VID), a priority of the S-Tag, and a priority or a Differentiated Services Code Point (DSCP) in the C-Tag.

9. The network device of claim 6, wherein the packet processing mode indicated by the corresponding match entry comprises: reference information indicating a specific characteristic value in the characteristic information of the packet to perform translation.

10. The network device of claim 9, wherein the packet is a packet in a VLAN, and the specific characteristic value is at least one of a DMAC Address, an SMAC Address, an S-Tag PID, a C-Tag PID, an S-VID, a C-VID, a priority of the S-Tag, and a priority or a DSCP in the C-Tag.

* * * * *